(12) United States Patent
Koetting et al.

(10) Patent No.: US 8,662,153 B2
(45) Date of Patent: Mar. 4, 2014

(54) BATTERY CELL ASSEMBLY, HEAT EXCHANGER, AND METHOD FOR MANUFACTURING THE HEAT EXCHANGER

(75) Inventors: William Koetting, Davisburg, MI (US); Sean O'Kane, Fraser, MI (US); Kwok Tom, Madison Heights, MI (US); Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 249 days.

(21) Appl. No.: 12/897,135

(22) Filed: Oct. 4, 2010

(65) Prior Publication Data

US 2012/0082880 A1  Apr. 5, 2012

(51) Int. Cl.
*F28F 3/14* (2006.01)

(52) U.S. Cl.
USPC .......................................................... 165/170

(58) Field of Classification Search
USPC ................................... 429/120; 165/168–171
See application file for complete search history.

(56) References Cited

U.S. PATENT DOCUMENTS

| | | | |
|---|---|---|---|
| 2,273,244 A | 2/1942 | Cornelius | |
| 2,391,859 A | 1/1946 | Earl | |
| 3,503,558 A | 3/1970 | Galiulo et al. | |
| 3,522,100 A | 7/1970 | Lindstrom | |
| 3,550,681 A | 12/1970 | Stier et al. | |
| 3,964,930 A | 6/1976 | Reiser | |
| 4,009,752 A | 3/1977 | Wilson | |
| 4,063,590 A | 12/1977 | McConnell | |
| 4,298,904 A | 11/1981 | Koenig | |
| 4,305,456 A | * 12/1981 | Mueller et al. | ................ 165/145 |
| 4,322,776 A | 3/1982 | Job et al. | |
| 4,390,841 A | 6/1983 | Martin et al. | |
| 4,396,689 A | 8/1983 | Grimes et al. | |
| 4,444,994 A | 4/1984 | Baker et al. | |

(Continued)

FOREIGN PATENT DOCUMENTS

| | | |
|---|---|---|
| CN | 1512518 A | 7/2004 |
| EP | 0736226 B1 | 3/1999 |

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner* — Maria J Laios
(74) *Attorney, Agent, or Firm* — Buckert Patent & Trademark Law Firm, P.C.; John F. Buckert

(57) ABSTRACT

A battery cell assembly, a heat exchanger, and a method for manufacturing the heat exchanger are provided. The heat exchanger includes a rectangular-shaped sheet having first and second rectangular-shaped sheet portions coupled together at a bent edge such that the sheet portions are disposed proximate to one another. Outer edges of the first and second rectangular-shaped sheet portions are coupled together such that an interior region is formed between the first and second rectangular-shaped sheet portions. The bent edge has first and second apertures extending therethrough. The heat exchanger further includes a first inlet port disposed on the bent edge over the first aperture, and a second outlet port disposed on the bent edge over the second aperture, such that fluid can flow through the first inlet port and into the interior region and then through the outlet port.

10 Claims, 10 Drawing Sheets

(56) References Cited

U.S. PATENT DOCUMENTS

| | | |
|---|---|---|
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A * | 1/1991 | Tomlinson .................... 165/170 |
| 4,995,240 A | 2/1991 | Barthel et al. |
| 5,057,968 A | 10/1991 | Morrison |
| 5,071,652 A | 12/1991 | Jones et al. |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,354,630 A | 10/1994 | Earl et al. |
| 5,356,735 A | 10/1994 | Meadows et al. |
| 5,364,711 A | 11/1994 | Yamada et al. |
| 5,385,793 A | 1/1995 | Tiedemann et al. |
| 5,487,955 A | 1/1996 | Korall et al. |
| 5,487,958 A | 1/1996 | Tura |
| 5,510,203 A | 4/1996 | Hamada et al. |
| 5,520,976 A | 5/1996 | Giannetti et al. |
| 5,561,005 A | 10/1996 | Omaru et al. |
| 5,589,290 A | 12/1996 | Klink et al. |
| 5,606,242 A | 2/1997 | Hull et al. |
| 5,652,502 A | 7/1997 | van Phuoc et al. |
| 5,658,682 A | 8/1997 | Usuda et al. |
| 5,663,007 A | 9/1997 | Ikoma et al. |
| 5,693,432 A | 12/1997 | Matsumoto |
| 5,736,836 A | 4/1998 | Hasegawa et al. |
| 5,756,227 A | 5/1998 | Suzuki et al. |
| 5,796,239 A | 8/1998 | can Phuoc et al. |
| 5,825,155 A | 10/1998 | Ito et al. |
| 5,937,664 A | 8/1999 | Matsuno et al. |
| 5,982,403 A | 11/1999 | Inagaki |
| 6,016,047 A | 1/2000 | Notten et al. |
| 6,087,036 A | 7/2000 | Rouillard et al. |
| 6,099,986 A | 8/2000 | Gauthier et al. |
| 6,111,387 A | 8/2000 | Kouzu et al. |
| 6,117,584 A | 9/2000 | Hoffman et al. |
| 6,121,752 A | 9/2000 | Kitihara et al. |
| 6,176,095 B1 | 1/2001 | Porter |
| 6,257,328 B1 | 7/2001 | Fujiwara et al. |
| 6,344,728 B1 | 2/2002 | Kouzu et al. |
| 6,353,815 B1 | 3/2002 | Vilim et al. |
| 6,362,598 B2 | 3/2002 | Laig-Horstebrock et al. |
| 6,399,238 B1 | 6/2002 | Oweis et al. |
| 6,406,812 B1 | 6/2002 | Dreulle et al. |
| 6,413,678 B1 | 7/2002 | Hamamoto et al. |
| 6,422,027 B1 | 7/2002 | Coates, Jr. et al. |
| 6,441,586 B1 | 8/2002 | Tate, Jr. et al. |
| 6,448,741 B1 | 9/2002 | Inui et al. |
| 6,462,949 B1 | 10/2002 | Parish, IV et al. |
| 6,475,659 B1 | 11/2002 | Heimer |
| 6,512,347 B1 | 1/2003 | Hellmann et al. |
| 6,515,454 B2 | 2/2003 | Schoch |
| 6,534,954 B1 | 3/2003 | Plett |
| 6,563,318 B2 | 5/2003 | Kawakami et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,709,783 B2 | 3/2004 | Ogata et al. |
| 6,724,172 B2 | 4/2004 | Koo |
| 6,750,630 B2 | 6/2004 | Inoue et al. |
| 6,771,502 B2 | 8/2004 | Getz, Jr. et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,829,562 B2 | 12/2004 | Sarfert |
| 6,832,171 B2 | 12/2004 | Barsoukov et al. |
| 6,876,175 B2 | 4/2005 | Schoch |
| 6,878,485 B2 | 4/2005 | Ovshinsky et al. |
| 6,886,249 B2 | 5/2005 | Smalc |
| 6,892,148 B2 | 5/2005 | Barsoukov et al. |
| 6,927,554 B2 | 8/2005 | Tate, Jr. et al. |
| 6,943,528 B2 | 9/2005 | Schoch |
| 6,967,466 B2 | 11/2005 | Koch |
| 6,982,131 B1 | 1/2006 | Hamada et al. |
| 7,012,434 B2 | 3/2006 | Koch |
| 7,026,073 B2 | 4/2006 | Ueda et al. |
| 7,039,534 B1 | 5/2006 | Ryno et al. |
| 7,061,246 B2 | 6/2006 | Dougherty et al. |
| 7,070,874 B2 | 7/2006 | Blanchet et al. |
| 7,072,871 B1 | 7/2006 | Tinnemeyer |
| 7,098,665 B2 | 8/2006 | Laig-Hoerstebrock |
| 7,109,685 B2 | 9/2006 | Tate, Jr. et al. |
| 7,126,312 B2 | 10/2006 | Moore |
| 7,143,724 B2 | 12/2006 | Hashizumi et al. |
| 7,147,045 B2 | 12/2006 | Quisenberry et al. |
| 7,150,935 B2 | 12/2006 | Hamada et al. |
| 7,197,487 B2 | 3/2007 | Hansen et al. |
| 7,199,557 B2 | 4/2007 | Anbuky et al. |
| 7,229,327 B2 | 6/2007 | Zhao et al. |
| 7,250,741 B2 | 7/2007 | Koo et al. |
| 7,251,889 B2 | 8/2007 | Kroliczek et al. |
| 7,253,587 B2 | 8/2007 | Meissner |
| 7,264,902 B2 | 9/2007 | Horie et al. |
| 7,278,389 B2 | 10/2007 | Kirakosyan |
| 7,315,789 B2 | 1/2008 | Plett |
| 7,321,220 B2 | 1/2008 | Plett |
| 7,327,147 B2 | 2/2008 | Koch |
| 7,400,115 B2 | 7/2008 | Plett |
| 7,446,504 B2 | 11/2008 | Plett |
| 7,467,525 B1 | 12/2008 | Ohta et al. |
| 7,479,758 B2 | 1/2009 | Moon |
| 7,518,339 B2 | 4/2009 | Schoch |
| 7,521,895 B2 | 4/2009 | Plett |
| 7,525,285 B2 | 4/2009 | Plett |
| 7,531,270 B2 | 5/2009 | Buck et al. |
| 7,583,059 B2 | 9/2009 | Cho |
| 7,589,532 B2 | 9/2009 | Plett |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 2001/0046624 A1 | 11/2001 | Goto et al. |
| 2002/0182493 A1 | 12/2002 | Ovshinsky et al. |
| 2003/0080714 A1 | 5/2003 | Inoue et al. |
| 2003/0082440 A1 | 5/2003 | Mrotek et al. |
| 2003/0184307 A1 | 10/2003 | Kozlowski et al. |
| 2003/0211384 A1 | 11/2003 | Hamada et al. |
| 2004/0021442 A1 | 2/2004 | Higashino |
| 2004/0069474 A1 | 4/2004 | Wu et al. |
| 2005/0026014 A1 | 2/2005 | Fogaing et al. |
| 2005/0089750 A1 | 4/2005 | Ng et al. |
| 2005/0100786 A1 | 5/2005 | Ryu et al. |
| 2005/0103486 A1 | 5/2005 | Demuth et al. |
| 2005/0110460 A1 | 5/2005 | Arai et al. |
| 2005/0127874 A1 | 6/2005 | Lim et al. |
| 2005/0134038 A1 | 6/2005 | Walsh |
| 2006/0100833 A1 | 5/2006 | Plett |
| 2006/0234119 A1 | 10/2006 | Kruger et al. |
| 2006/0286450 A1 | 12/2006 | Yoon et al. |
| 2007/0037051 A1 | 2/2007 | Kim et al. |
| 2007/0062681 A1 * | 3/2007 | Beech ........................... 165/170 |
| 2007/0087266 A1 | 4/2007 | Bourke et al. |
| 2007/0120533 A1 | 5/2007 | Plett |
| 2007/0126396 A1 | 6/2007 | Yang |
| 2008/0003491 A1 | 1/2008 | Yahnker et al. |
| 2008/0041079 A1 | 2/2008 | Nishijima et al. |
| 2008/0094035 A1 | 4/2008 | Plett |
| 2008/0110189 A1 | 5/2008 | Alston et al. |
| 2008/0182151 A1 | 7/2008 | Mizusaki et al. |

(56) References Cited

U.S. PATENT DOCUMENTS

| | | |
|---|---|---|
| 2008/0248338 A1 | 10/2008 | Yano et al. |
| 2008/0314071 A1 | 12/2008 | Ohta et al. |
| 2009/0029239 A1 | 1/2009 | Koetting et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325053 A1 | 12/2009 | Koetting et al. |
| 2009/0325054 A1 | 12/2009 | Payne et al. |
| 2009/0325055 A1 | 12/2009 | Koetting et al. |
| 2009/0325059 A1 | 12/2009 | Niedzwiecki et al. |
| 2010/0086842 A1 | 4/2010 | Yang |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2011/0027640 A1 | 2/2011 | Gadawski et al. |
| 2011/0041525 A1 | 2/2011 | Kim et al. |
| 2011/0052959 A1 | 3/2011 | Koetting et al. |

FOREIGN PATENT DOCUMENTS

| | | |
|---|---|---|
| EP | 0673553 B1 | 2/2001 |
| EP | 1435675 A1 | 7/2004 |
| EP | 1577966 A | 9/2005 |
| EP | 1852925 A | 11/2007 |
| JP | 4056079 A | 2/1992 |
| JP | 08111244 | 4/1996 |
| JP | 8138735 A | 5/1996 |
| JP | 8222280 A | 8/1996 |
| JP | 9129213 A | 5/1997 |
| JP | 09-219213 | 8/1997 |
| JP | 10199510 A | 7/1998 |
| JP | 11066949 A | 3/1999 |
| JP | 11191432 A | 7/1999 |
| JP | 2001105843 A | 4/2001 |
| JP | 2002038033 A | 2/2002 |
| JP | 2002319383 A | 10/2002 |
| JP | 2003188323 A | 7/2003 |
| JP | 2003219572 A | 7/2003 |
| JP | 2003282112 A | 10/2003 |
| JP | 2004333115 A | 11/2004 |
| JP | 2005-126315 | 5/2005 |
| JP | 2005147443 A | 6/2005 |
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008-080995 | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 100889241 B1 | 3/2009 |
| KR | 20090082212 A | 7/2009 |
| KR | 100921346 B1 | 10/2009 |
| WO | WO03/071616 A2 | 8/2003 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |

OTHER PUBLICATIONS

European Supplementary Search Report dated Aug. 28, 2009 for EP Application No. 04774658.
International Search Report for International application No. PCT/KR2005/003755 dated Mar. 2, 2006.
International Search Report for PCT/KR2009/000258 dated Aug. 28, 2009.
International Search report for PCT/KR2009/003434 dated Jan. 18, 2010.
Machine translation of JP 08-138735.
Machine translation of JP 10-199510.
Machine translation of JP 2000 260469.
U.S. Appl. No. 12/426,795, filed Apr. 20, 2009 entitled Frame Member, Frame Assembly and Battery Cell Assembly Made Therefrom and Methods of Making the Same.
U.S. Appl. No. 12/433,155, filed Apr. 30, 2009 entitled Cooling System for a Battery System and a Method for Cooling the Battery System.
U.S. Appl. No. 12/433,397, filed Apr. 30, 2009 entitled Battery Systems, Battery Modules, and Method for Cooling a Battery Module.
U.S. Appl. No. 12/433,427, filed Apr. 30, 2009 entitled Cooling Manifold and Method for Manufacturing the Cooling Manifold.
U.S. Appl. No. 12/433,485, filed Apr. 30, 2009 entitled Battery Systems, Battery Module, and Method for Cooling the Battery Module.
U.S. Appl. No. 12/433,534, filed Apr. 30, 2009 entitled Battery Systems, Battery Modules, and Method for Cooling a Battery Module.
U.S. Appl. No. 12/511,530, filed Jul. 29, 2009 entitled Battery Module and Method for Cooling the Battery Module.
U.S. Appl. No. 12/511,552, filed Jul. 29, 2009 entitled Battery Module and Method for Cooling the Battery Module.
U.S. Appl. No. 12/549,766, filed Aug. 28, 2009 entitled Battery Module and Method for Cooling the Battery Module.
U.S. Appl. No. 12/794,949, filed Jun. 7, 2010 entitled Battery Module and Methods for Bonding a Cell Terminal of a Battery to an Interconnect Member.
U.S. Appl. No. 12/857,908, filed Aug. 17, 2010 entitled Battery Cell Assemblies.
U.S. Appl. No. 12/861,364, filed Aug. 23, 2010 entitled Connecting Assembly.
U.S. Appl. No. 12/861,375, filed Aug. 23, 2010 entitled attery System and Manifold Assembly Having a Manifold Member and a Connecting Fitting.
U.S. Appl. No. 12/861,381, filed Aug. 23, 2010 entitled End Cap.
U.S. Appl. No. 12/861,394, filed Aug. 23, 2010 entitled Battery System and Manifold Assembly With Two Manifold Members Removably Coupled Together.
U.S. Appl. No. 12/868,111, filed Aug. 25, 2010 entitled Battery Module and Methods for Bonding Cell Terminals of Battery Cells Together.
"Gasket". Merriam-Webster. Merriam-Webster. Web. May 30, 2012. <http://www.merriam-webster.com/dictionary/gasket>.
International Search Report; International Application No. PCT/KR2009/003428, International Filing Date: Jun. 25, 2009; Date of Mailing: Jan. 22, 2010; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003430; International Filing Date: Jun. 25, 2009; Date of Mailing: Feb. 3, 2010; 2 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2009/006121; International Filing Date: Oct. 22, 2009; Date of Mailing: May 3, 2010; 2 pages.

(56) References Cited

OTHER PUBLICATIONS

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: May 3, 2010; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

Thomas J. Gadawski et al., pending U.S. Appl. No. 13/433,649 entitled "Battery System and Method For Cooling the Battery System," filed with the U.S. Patent and Trademark Office on Mar. 29, 2012.

U.S. Appl. No. 13/475,963, filed May 19, 2012 entitled Battery Cell Assembly and Method for Manufacturing a Cooling Fin for the Battery Cell Assembly.

U.S. Appl. No. 13/586,960, filed Aug. 16, 2012 entitled Battery Module.

U.S. Appl. No. 13/587,030, filed Aug. 16, 2012 entitled Battery Module and Method for Assembling the Battery Module.

U.S. Appl. No. 13/766,162, filed Feb. 13, 2013 entitled Battery Cell Assembly and Method for Manufacturing the Battery Cell Assembly.

U.S. Appl. No. 13/861,426, filed Apr. 12, 2013 entitled Battery Cell Assembly and Method for Manufacturing a Cooling Fin for the Battery Cell Assembly.

U.S. Appl. No. 13/686,018, filed Nov. 27, 2012 entitled Battery System and Method for Cooling a Battery Cell Assembly.

\* cited by examiner

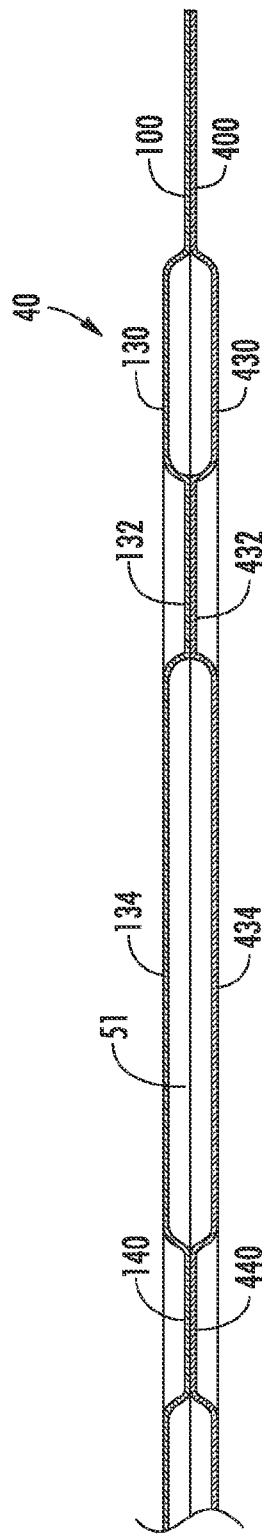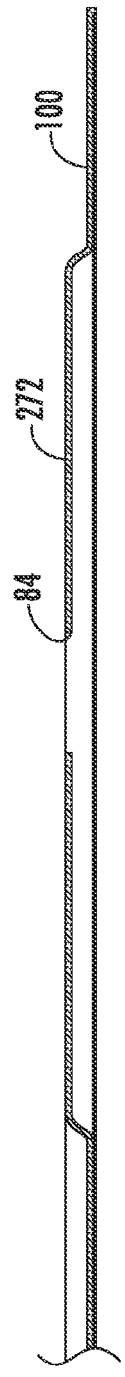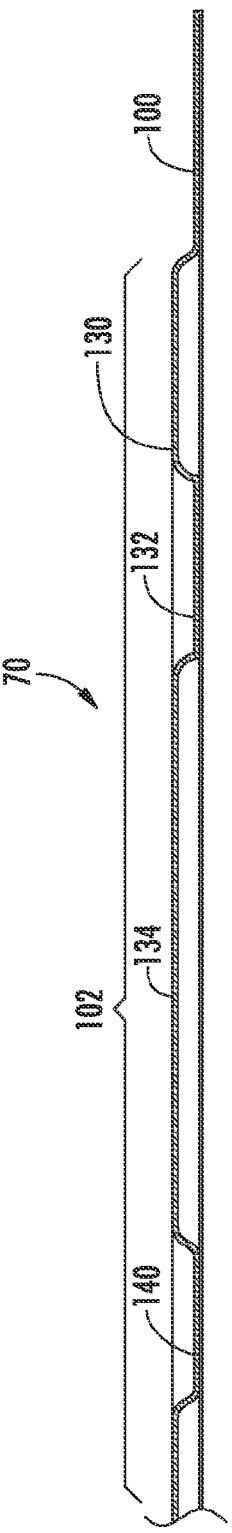

BATTERY CELL ASSEMBLY, HEAT EXCHANGER, AND METHOD FOR MANUFACTURING THE HEAT EXCHANGER

BACKGROUND

This application relates generally to a battery cell assembly, a heat exchanger, and a method for manufacturing the heat exchanger.

SUMMARY

A heat exchanger in accordance with an exemplary embodiment is provided. The heat exchanger includes a rectangular-shaped sheet having first and second rectangular-shaped sheet portions coupled together at a bent edge of the rectangular-shaped sheet such that the first and second rectangular-shaped sheet portions are disposed proximate to one another and generally parallel to one another. Outer edges of the first and second rectangular-shaped sheet portions are coupled together such that an interior region is formed between the first and second rectangular-shaped sheet portions. The bent edge has first and second apertures extending therethrough. The heat exchanger further includes a first inlet port disposed on the bent edge over the first aperture. The heat exchanger further includes a second outlet port disposed on the bent edge over the second aperture, such that fluid can flow through the first inlet port and into the interior region and then through the outlet port.

A battery cell assembly in accordance with another exemplary embodiment is provided. The battery cell assembly includes a first frame member and a second frame member configured to be coupled to the first frame member. The battery cell assembly further includes a battery cell disposed between the first and second frame members. The battery cell assembly further includes a heat exchanger disposed adjacent to the battery cell and between the first and second frame members. The heat exchanger has a rectangular-shaped sheet with first and second rectangular-shaped sheet portions coupled together at a bent edge of the rectangular-shaped sheet such that the first and second rectangular-shaped sheet portions are disposed proximate to one another and generally parallel to one another. Outer edges of the first and second rectangular-shaped sheet portions are coupled together such that an interior region is formed between the first and second rectangular-shaped sheet portions. The bent edge has first and second apertures extending therethrough. The heat exchanger further includes a first inlet port disposed on the bent edge over the first aperture. The heat exchanger further includes a second outlet port disposed on the bent edge over the second aperture, such that fluid can flow through the first inlet port and into the interior region and then through the outlet port.

A method for manufacturing a heat exchanger in accordance with another exemplary embodiment is provided. The method includes bending a rectangular-shaped sheet having first and second rectangular-shaped sheet portions at a bent edge of the rectangular-shaped sheet such that the first and second rectangular-shaped sheet portions are disposed proximate to one another, utilizing a bending device. The method further includes welding outer edges of the first and second rectangular-shaped sheet portions together such that an interior region is formed between the first and second rectangular-shaped sheet portions, utilizing a welding device. The bent edge has first and second apertures extending therethrough. The method further includes welding a first inlet port on the bent edge over the first aperture, utilizing the welding device. The method further includes welding a second outlet port on the bent edge over the second aperture, utilizing the welding device.

These and other advantages and features will become more apparent from the following description taken in conjunction with the drawings.

BRIEF DESCRIPTION OF THE DRAWINGS

FIG. 5 is a cross-sectional view of a portion of the heat exchanger of FIG. 2;

FIG. 6 is a cross-sectional view of a portion of the rectangular-shaped sheet of FIG. 3;

FIG. 7 is a cross-sectional view of another portion of the rectangular-shaped sheet of FIG. 3;

DETAILED DESCRIPTION

Figure 1:
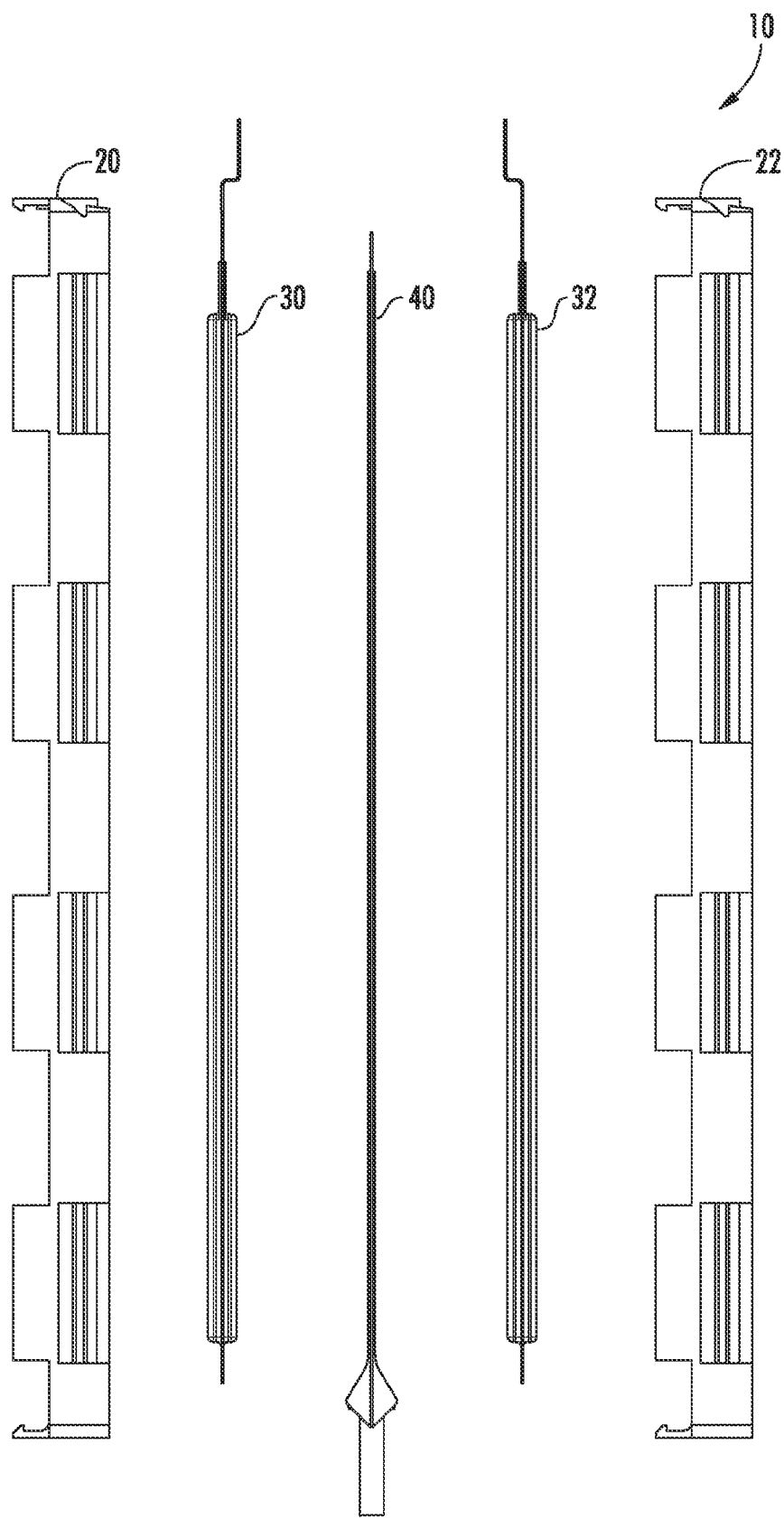
FIG. 1 is an exploded view of a battery cell assembly in accordance with an exemplary embodiment.

Referring to FIG. 1, a battery cell assembly 10 in accordance with an exemplary embodiment is illustrated. The battery cell assembly 10 is configured to provide electrical power to either a primary drive train of the vehicle or an auxiliary drive train of a vehicle. The battery cell assembly 10 includes frame members 20, 22, battery cells 30, 32, and a heat exchanger 40.

The frame members 20, 22 are configured to be coupled together to hold the battery cells 30, 32, and the heat exchanger 40 therebetween. In one exemplary embodiment, the frame members 20, 22 are constructed of plastic and are rectangular ring-shaped.

The battery cells 30, 32 are configured to generate first and second output voltages, respectively. In one exemplary embodiment, the battery cells 30, 32 are rectangular-shaped pouch-type lithium-ion battery cells. Of course, in alternate embodiments, other types of battery cells known to those skilled in the art could be utilized.

Figure 2:
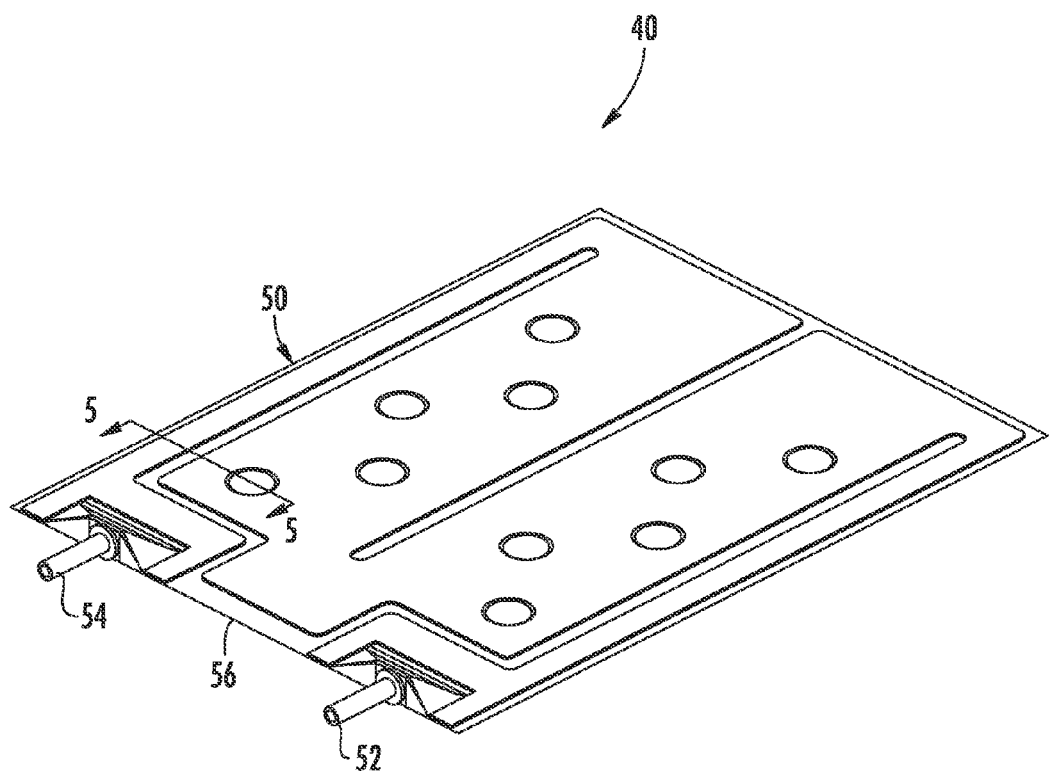
FIG. 2 is an isometric view of a heat exchanger utilized in the battery cell assembly of FIG. 1.
Figure 3:
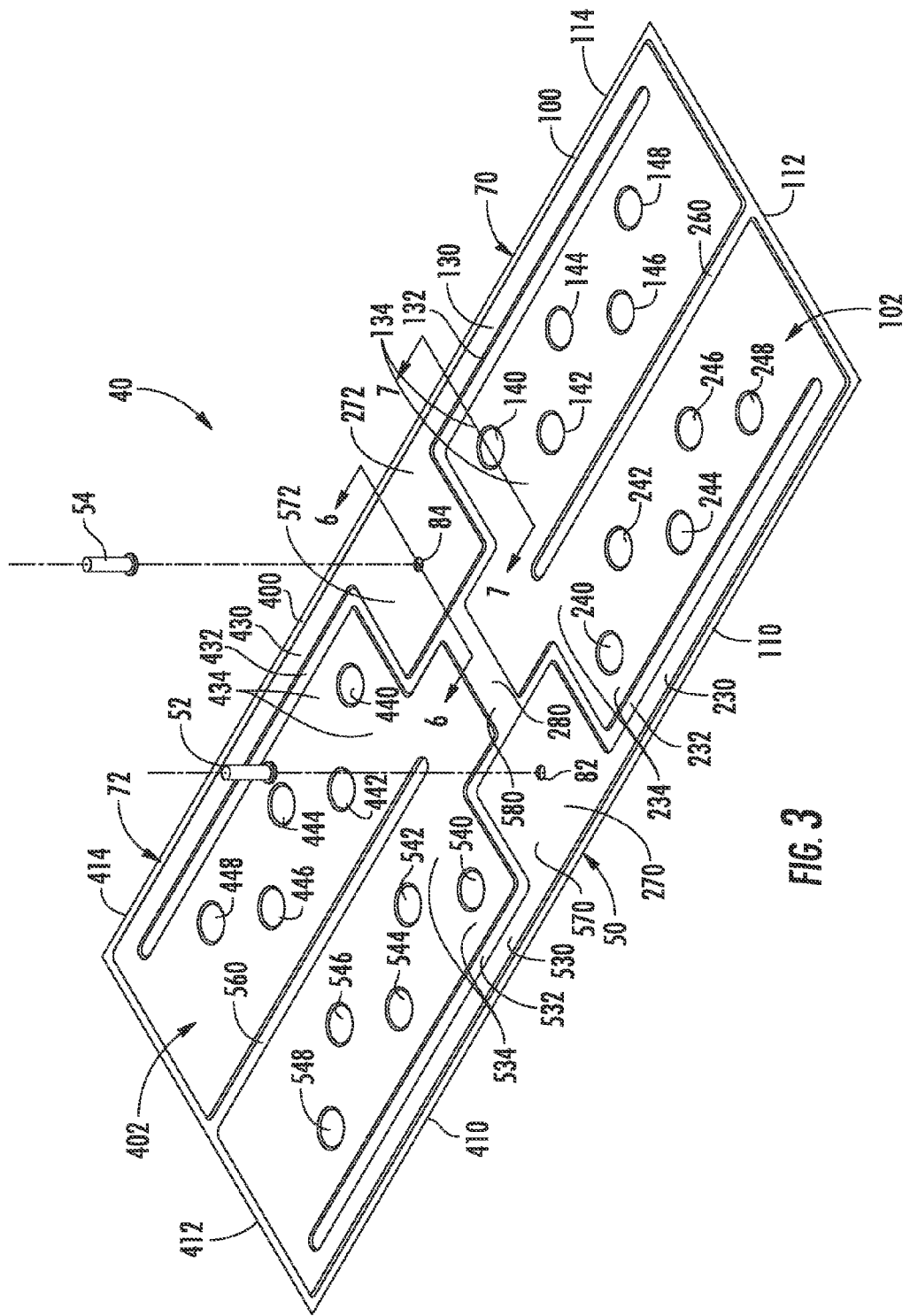
FIG. 3 is an isometric view of a rectangular-shaped sheet utilized to construct the heat exchanger of FIG. 2.
Figure 4:
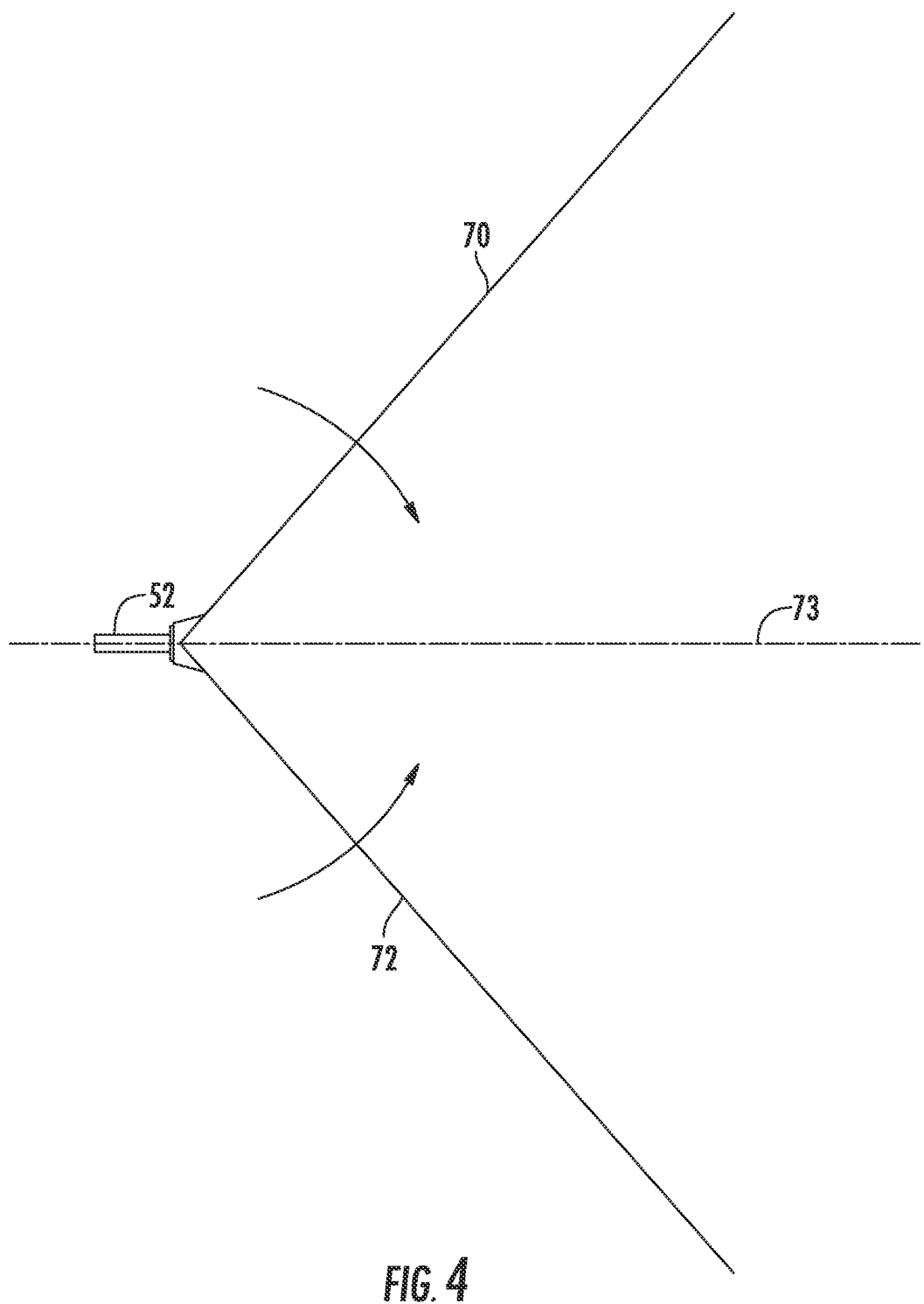
FIG. 4 is a side view illustrating first and second rectangular-shaped sheet portions being bent towards one another.
Figure 8:
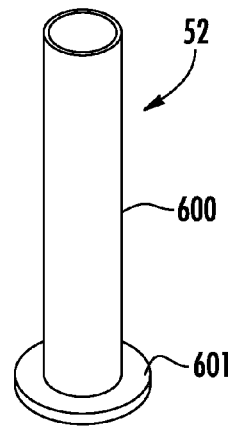
FIG. 8 is a schematic of an inlet port utilized in the battery cell assembly of FIG. 1.
Figure 9:
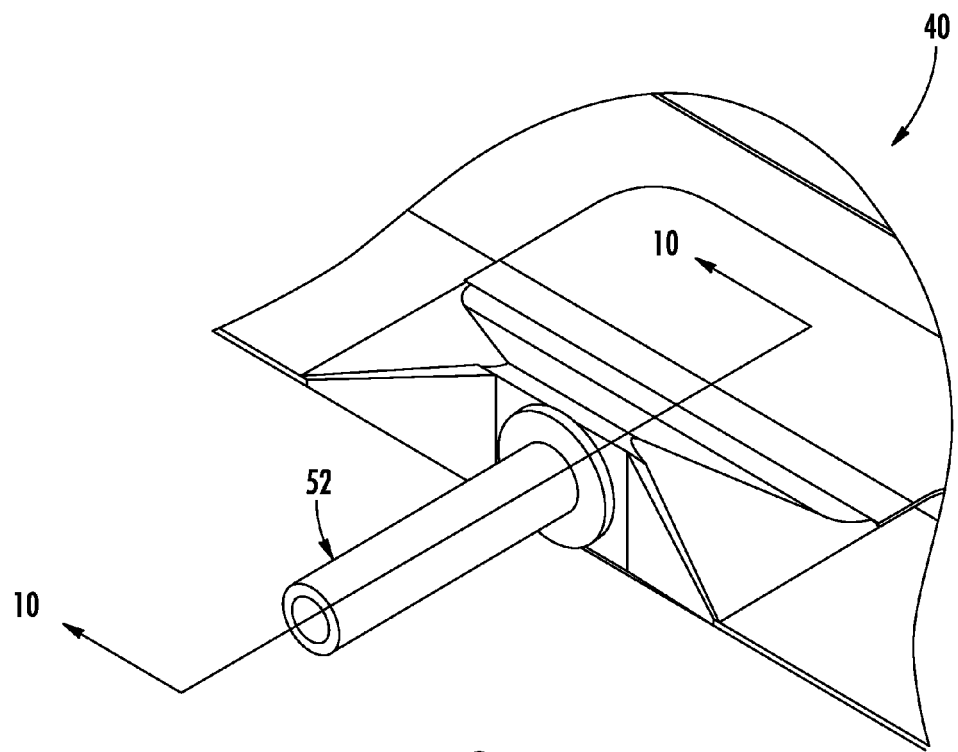
FIG. 9 is a schematic of a portion of the battery cell assembly of FIG. 1.

Referring to FIGS. 2, 3 and 5, the heat exchanger 40 is configured to receive a coolant or fluid that flows through the heat exchanger 40 to extract heat energy from the battery cells 30, 32. As shown, in one exemplary embodiment, the heat exchanger 40 is disposed between the battery cells 30, 32. The heat exchanger 40 includes a rectangular-shaped sheet 50, an inlet port 52, and an outlet port 54.

The rectangular-shaped sheet 50 is folded onto itself to define an interior region 51 for receiving fluid therein. In one exemplary embodiment, the rectangular-shaped sheet 50 is constructed of aluminum. In an alternative embodiment, the rectangular-shaped sheet 50 is constructed of stainless steel.

Of course, in other embodiments, other types of materials known to those skilled in the art could be utilized to construct the sheet 50. The rectangular-shaped sheet 50 includes rectangular-shaped sheet portions 70, 72 that are integral with one another and coupled together at the bent edge 56 of the rectangular-shaped sheet 50 such that the sheet portions 70, 72 are disposed proximate to one another and generally parallel to one another. Outer edges of the rectangular-shaped sheet portions 70, 72 are coupled together such that the interior region 51 is formed between the sheet portions 70, 72. The bent edge 56 also has apertures 82, 84 extending therethrough.

Referring to FIGS. 2, 3 and 5-7, the rectangular-shaped sheet portion 70 includes an outer peripheral flat sheet portion 100, an interior sheet portion 102, and outer edges 110, 112, 114. The interior sheet portion 102 is surrounded by the outer edges 110, 112, 114 and the bent edge 56, and is configured to at least partially define a flow path for fluid flowing through the heat exchanger 40.

The interior sheet portion 102 includes a raised portion 130, a flat linearly-extending dividing portion 132, a raised portion 134, flat circular-shaped dividing portions 140, 142, 144, 146, 148, a raised portion 230, a flat linearly-extending dividing portion 232, a raised portion 234, flat circular-shaped dividing portions 240, 242, 244, 246, 248, a flat linearly-extending dividing portion 260, raised portions 270, 272, and a flat central portion 280. Co-planar portions include the flat linearly-extending dividing portion 132, the flat circular-shaped dividing portions 140, 142, 144, 146, 148, the flat linearly-extending dividing portion 232, the flat circular-shaped dividing portions 240, 242, 244, 246, 248, the flat linearly-extending dividing portion 260, and the flat central portion 280.

The raised portion 130 is disposed between the outer edge 114 and the flat linearly-extending dividing portion 132. Further, the raised portion 134 is disposed between the flat linearly-extending dividing portion 132 and the flat linearly-extending dividing portion 260. The flat circular-shaped dividing portions 140, 142, 144, 146, 148 are also disposed between the flat linearly-extending dividing portion 132 and the flat linearly-extending dividing portion 260.

The raised portion 230 is disposed between the outer edge 110 and the flat linearly-extending dividing portion 232. Further, the raised portion 234 is disposed between the flat linearly-extending dividing portion 232 and the flat linearly-extending dividing portion 260. The flat circular-shaped dividing portions 240, 242, 244, 246, 248 are also disposed between the flat linearly-extending dividing portion 232 and the flat linearly-extending dividing portion 260. Finally, the raised portions 270, 272 and the flat central portion 280 are disposed proximate to the bent edge 56 of the heat exchanger 40.

The rectangular-shaped sheet portion 72 includes an outer peripheral flat sheet portion 400, an interior sheet portion 402, and outer edges 410, 412, 414. The interior sheet portion 402 is surrounded by the outer edges 410, 412, 414 and the bent edge 56, and is configured to at least partially define a flow path for fluid flowing through the heat exchanger 40.

The interior sheet portion 402 includes a raised portion 430, a flat linearly-extending dividing portion 432, a raised portion 434, flat circular-shaped dividing portions 440, 442, 444, 446, 448, a raised portion 530, a flat linearly-extending dividing portion 532, a raised portion 534, flat circular-shaped dividing portions 540, 542, 544, 546, 548, a flat linearly-extending dividing portion 560, raised portions 570, 572, and a flat central portion 580. Co-planar portions include the flat linearly-extending dividing portion 432, the flat circular-shaped dividing portions 440, 442, 444, 446, 448, the flat linearly-extending dividing portion 532, the flat circular-shaped dividing portions 540, 542, 544, 546, 548, and the flat linearly-extending dividing portion 560, and the flat central portion 580.

The raised portion 430 is disposed between the outer edge 414 and the flat linearly-extending dividing portion 432. Further, the raised portion 434 is disposed between the flat linearly-extending dividing portion 432 and the flat linearly-extending dividing portion 560. The flat circular-shaped dividing portions 440, 442, 444, 446, 448 are also disposed between the flat linearly-extending dividing portion 432 and the flat linearly-extending dividing portion 560.

The raised portion 530 is disposed between the outer edge 414 and the flat linearly-extending dividing portion 532. Further, the raised portion 534 is disposed between the flat linearly-extending dividing portion 532 and the flat linearly-extending dividing portion 560. The flat circular-shaped dividing portions 540, 542, 544, 546, 548 are also disposed between the flat linearly-extending dividing portion 532 and the flat linearly-extending dividing portion 560. Finally, the raised portions 570, 572 and the flat central portion 580 are disposed proximate to the bent edge 56 of the heat exchanger 40.

Figure 10:
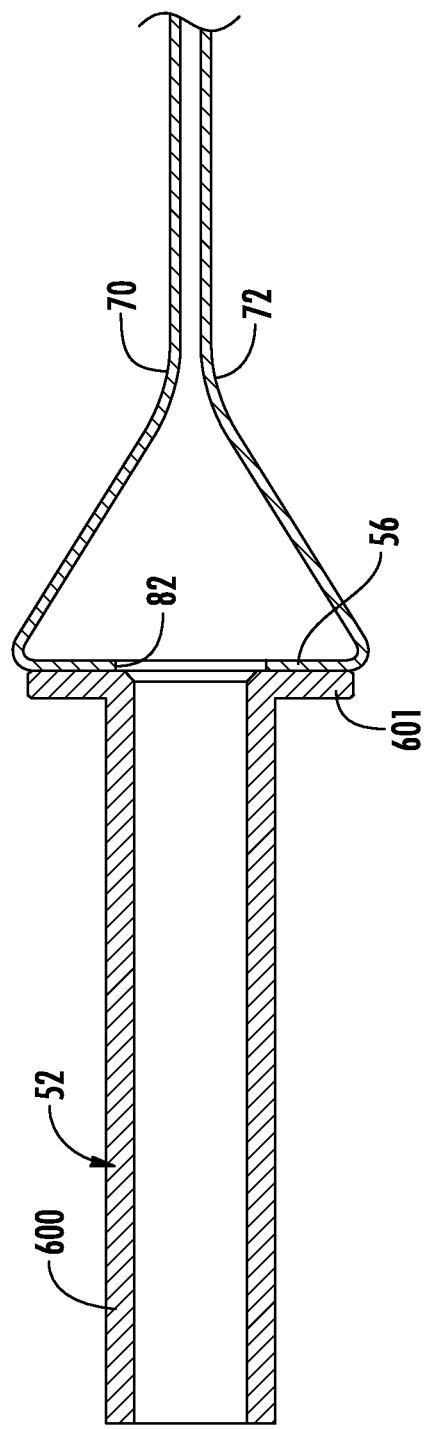
FIG. 10 is a cross-sectional schematic of a portion of the battery cell assembly of FIG. 1.

Referring to FIG. 10, the inlet port 52 is configured to route fluid into the interior region 51 of the heat exchanger 40. The inlet port 52 has a tubular portion 600 and a ring-shaped portion 601 coupled to an end of the tubular portion 600. The ring-shaped portion 601 is welded to the bent edge 56 over the aperture 82.

The outlet port 54 is configured to route fluid from the interior region 51 of the heat exchanger 40. The outlet port 54 has an identical structure as the inlet port 52. A ring-shaped portion of the outlet port 54 is welded to the bent edge 56 over the aperture 84.

Referring to FIGS. 8-10 and 12-13, a flowchart of a method for manufacturing the heat exchanger 40 utilizing a manufacturing system 949 will now be described.

At step 900, the bending device 950 bends the rectangular-shaped sheet 50 having rectangular-shaped sheet portions 70, 72 at the bent edge 56 of the rectangular-shaped sheet 50 such that opposite edges 112, 114 of the rectangular-shaped sheet portions 70, 72 are disposed proximate to one another.

At step 902, the welding device 950 welds outer edges of the rectangular-shaped sheet portions 70, 72 together such that the interior region 51 is formed between the rectangular-shaped sheet portions 70, 72. The bent edge 56 has apertures 82, 84 extending therethrough. In particular, referring to FIG. 11, the welding device 950 forms a welding joint 714 along outer edges of the rectangular-shaped sheet portions 70, 72 that are disposed adjacent to one another. Further, the welding device 940 forms a welding joint 732 along the flat linearly-extending dividing portions 132, 432 that are disposed adjacent to one another. Further, the welding device 950 forms a welding joint 760 along the flat linearly-extending dividing portions 260, 560 that are disposed adjacent to one another. Still further, the welding device 950 forms a welding joint 832 along the flat linearly-extending dividing portions 232, 532 that are disposed adjacent to one another. Still further, the welding device 950 forms welding joints 740, 742, 744, 746, 748 on the flat circular-shaped dividing portions 140, 142, 144, 146, 148 that are disposed adjacent to the flat circular-shaped dividing portions 440, 442, 444, 446, 448, respectively. Also, the welding device 950 forms welding joints 840, 842, 844, 846, 848 on the flat circular-shaped dividing portions 240, 242, 244, 246, 248 that are disposed adjacent to the flat circular-shaped dividing portions 540, 542, 544, 546, 548, respectively.

At step 904, the welding device 950 welds the inlet port 52 on the bent edge 56 over the aperture 82.

At step 906, the welding device 950 welds the outlet port 54 on the bent edge 56 over the aperture 84.

Figure 11:
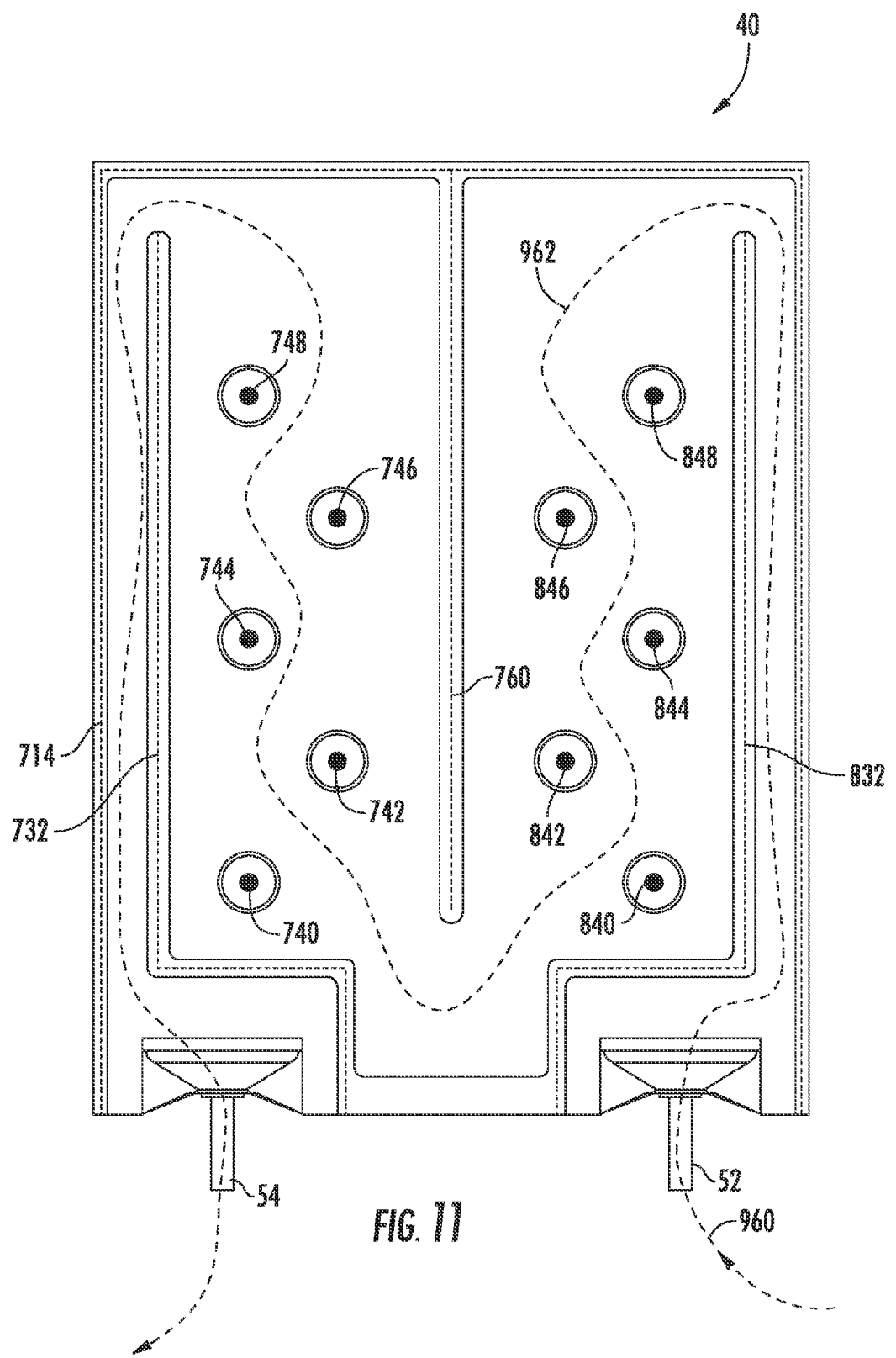
FIG. 11 is a top view of the battery cell assembly of FIG. 1.
Figure 12:
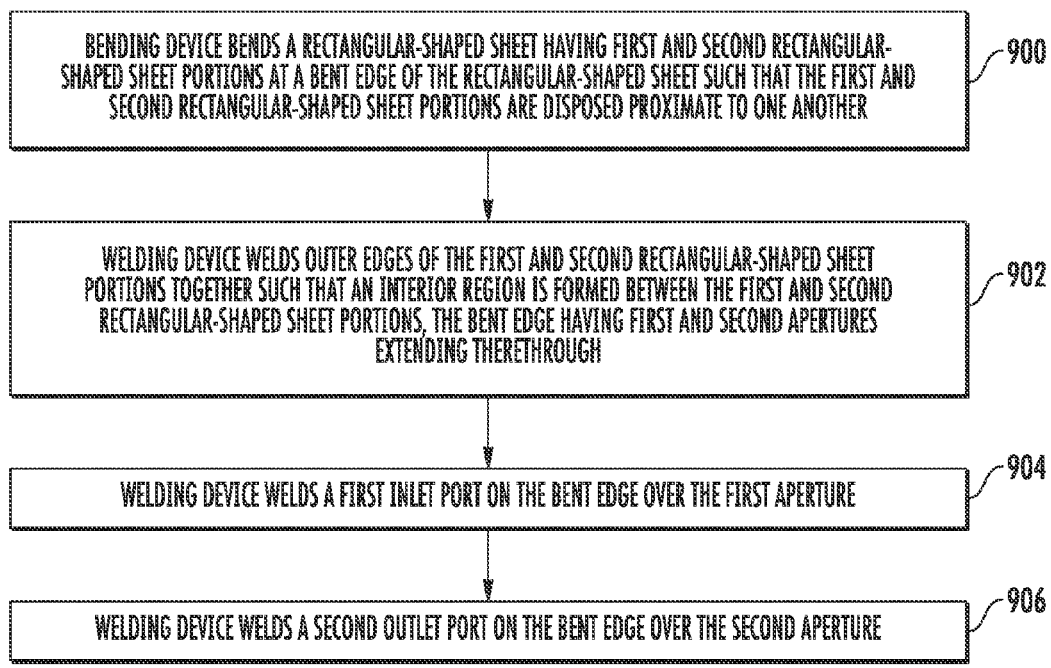
FIG. 12 is a flowchart of a method for manufacturing the heat exchanger of FIG. 2.
Figure 13:
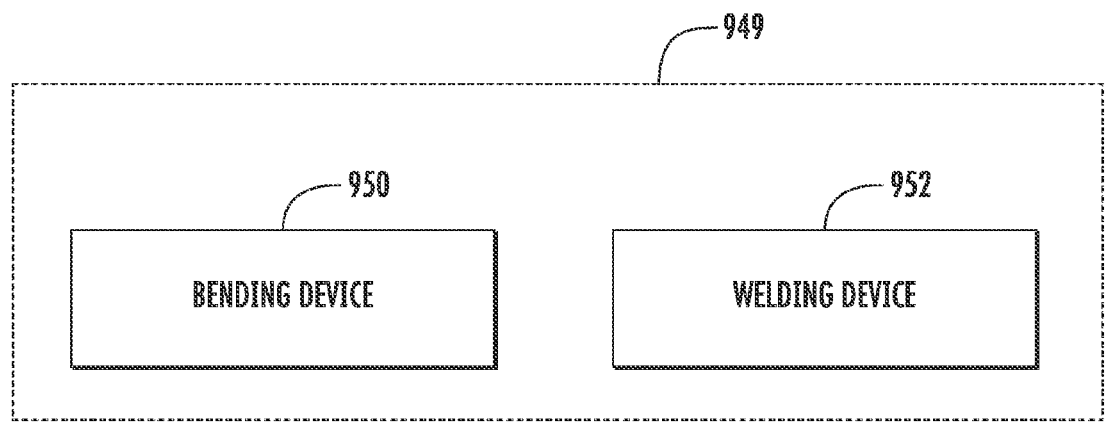
FIG. 13 is a block diagram of a system for manufacturing the heat exchanger FIG. 2.

Referring to FIG. 11, the operation of the heat exchanger 40 will now be described. As shown, fluid 960 flows through the inlet port 542 into the interior region 51 of the heat exchanger 40. The fluid travels along a flow path 962 within the heat exchanger 40 and then flows out of the outlet port 54 of the heat exchanger 40. Heat energy is transferred from the battery cells 30, 32 into the sheet portions 70, 72, respectively. Also, the heat energy in the sheet portions 70, 72 are transferred into the fluid flowing through the heat exchanger 40. Thus, when the fluid exits the heat exchanger 40, the heat energy from the battery cells 30, 32 is removed from the battery cell assembly 10.

An advantage of utilizing the heat exchanger 40 is that the heat exchanger 40 utilizes the bent edge 56 that does not require a welding joint to seal the bent edge 56. Further, another advantage of utilizing heat exchanger 40 is that the heat exchanger 40 can be quickly manufactured by simply bending the rectangular-shaped sheet 50 and then forming a few weld joints in the sheet 50.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

We claim:

1. A heat exchanger, comprising:
a rectangular-shaped sheet having first and second rectangular-shaped sheet portions coupled together at a bent edge of the rectangular-shaped sheet such that the first and second rectangular-shaped sheet portions are disposed proximate to one another and generally parallel to one another, outer edges of the first and second rectangular-shaped sheet portions being coupled together such that an interior region is formed between the first and second rectangular-shaped sheet portions, the bent edge defining an outer planar surface, the bent edge having first and second apertures extending therethrough;
a first inlet port having a tubular portion and a ring-shaped portion, the ring-shaped portion being coupled to an end of the tubular portion and extending substantially perpendicular and outwardly from the tubular portion, the ring-shaped portion being disposed on and coupled to the outer planar surface of the bent edge, the ring-shaped portion being further disposed over the first aperture; and
a first outlet port being disposed on the bent edge over the second aperture, such that fluid can flow through the first inlet port and into the interior region and then through the first outlet port.

2. The heat exchanger of claim 1, wherein the first rectangular-shaped sheet portion has a first outer peripheral flat sheet portion, a first interior sheet portion, and first, second, and third outer edges;
the first outer peripheral flat sheet portion being disposed proximate to the first, second, and third outer edges of the first rectangular-shaped sheet portion; and
the first interior sheet portion being surrounded by the first outer peripheral flat sheet portion and the bent edge, and at least a first portion of the first interior sheet portion extending outwardly from the first outer peripheral flat sheet portion.

3. The heat exchanger of claim 2, wherein the second rectangular-shaped sheet portion has a second outer peripheral flat sheet portion, a second interior sheet portion, and first, second, and third outer edges;
the second outer peripheral flat sheet portion being disposed proximate to the first, second, and third outer edges of the second rectangular-shaped sheet portion;
the second interior sheet portion being surrounded by the second outer peripheral flat sheet portion and the bent edge, and at least a second portion of the second interior sheet portion extending outwardly from the second outer peripheral flat sheet portion; and
the second outer peripheral flat sheet portion being disposed adjacent to the first outer peripheral flat sheet portion and coupled to the first outer peripheral flat sheet portion.

4. The heat exchanger of claim 3, wherein
the first interior sheet portion includes a third portion substantially co-planar with the first outer peripheral flat sheet portion that extends from the bent edge toward the second edge of the first rectangular-shaped sheet portion; and
the second interior sheet portion includes a fourth portion substantially co-planar with the second outer peripheral flat sheet portion that extends from the bent edge toward the second edge of the second rectangular-shaped sheet portion, the third portion of the first interior sheet portion being disposed adjacent to the fourth portion of the second interior sheet portion, such that the interior region is at least partially partitioned by the third and fourth portions.

5. The heat exchanger of claim 4, wherein third and fourth portions are linearly-extending portions.

6. The heat exchanger of claim 4, wherein the third and fourth portions are circular-shaped portions.

7. The heat exchanger of claim 1, wherein the rectangular-shaped sheet is constructed of at least one of aluminum and stainless-steel.

8. The heat exchanger of claim 1, wherein the first and second rectangular-shaped sheet portions define a planar sheet portion at the bent edge having the first aperture extending therethrough, the planar sheet portion having the outer planar surface.

9. The heat exchanger of claim 8, wherein the first and second rectangular-shaped sheet portions further define first and second sheet portions, respectively, extending from the planar sheet portion at first and second arcuate angles, respectively, relative to the planar sheet portion.

10. The heat exchanger of claim 1, wherein each of the first and second rectangular-shaped sheet portions have a substantially uniform thickness.

* * * * *